Figure 1:
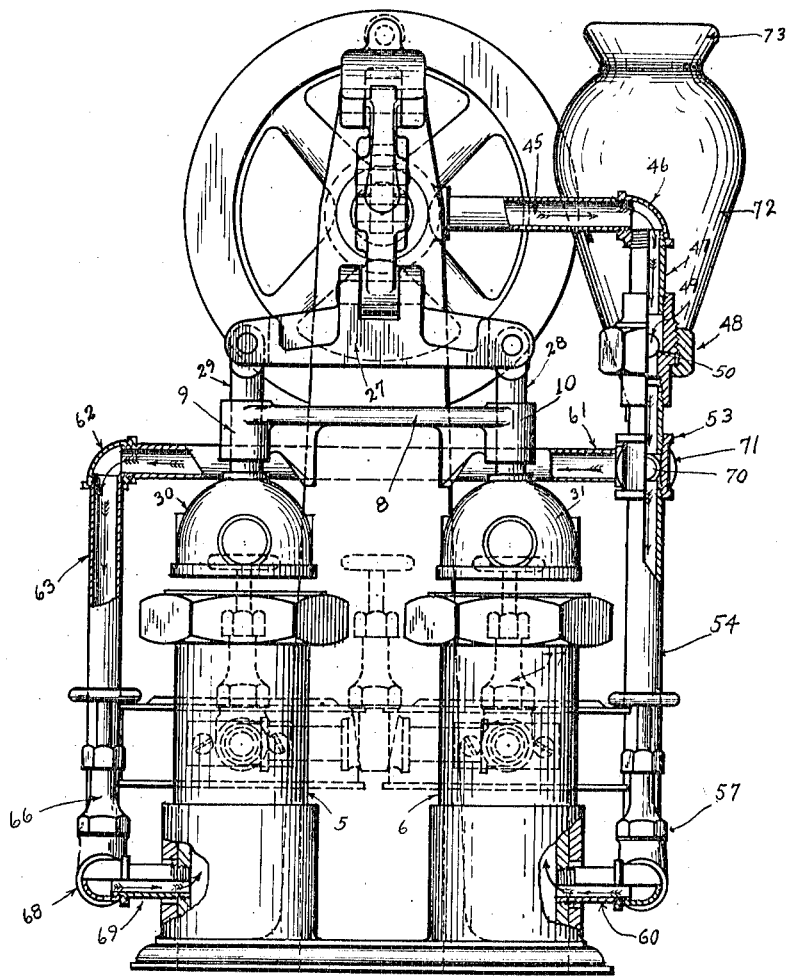

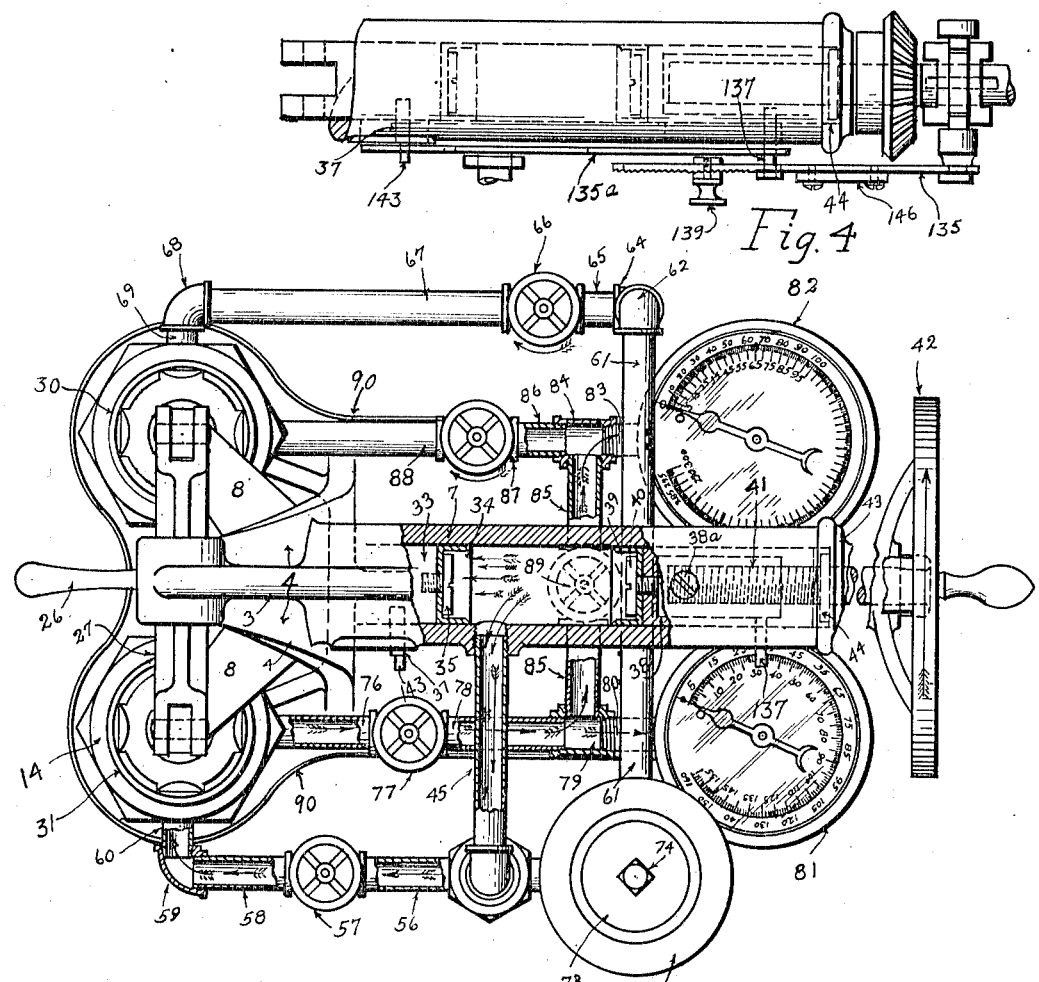

W. H. & C. W. PUTNAM.
STRENGTH TESTING MACHINE FOR SHEETS AND FABRICS.
APPLICATION FILED JAN. 16, 1912.

1,116,118.

Patented Nov. 3, 1914.
10 SHEETS—SHEET 4.

WITNESSES:

INVENTORS.

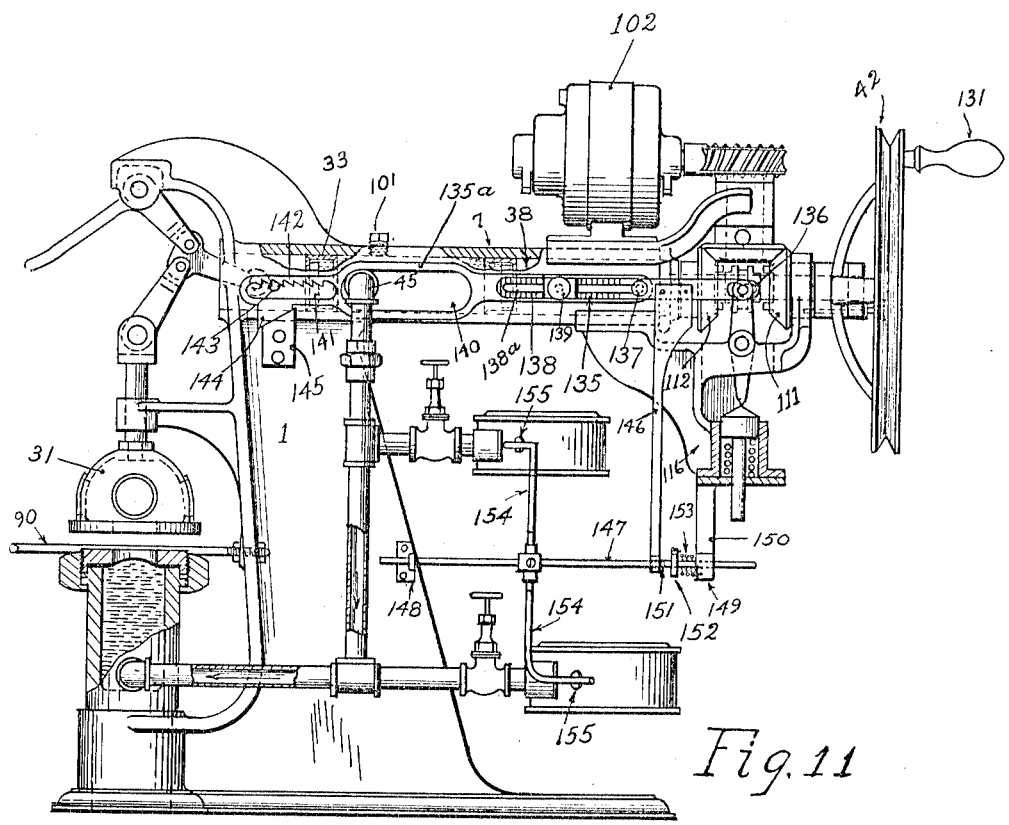
Fig. 11
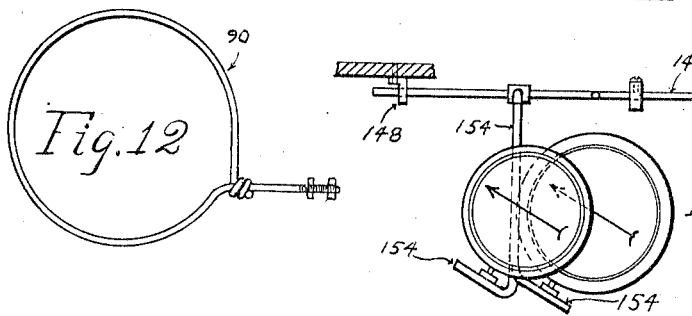
Fig. 12
Fig. 13

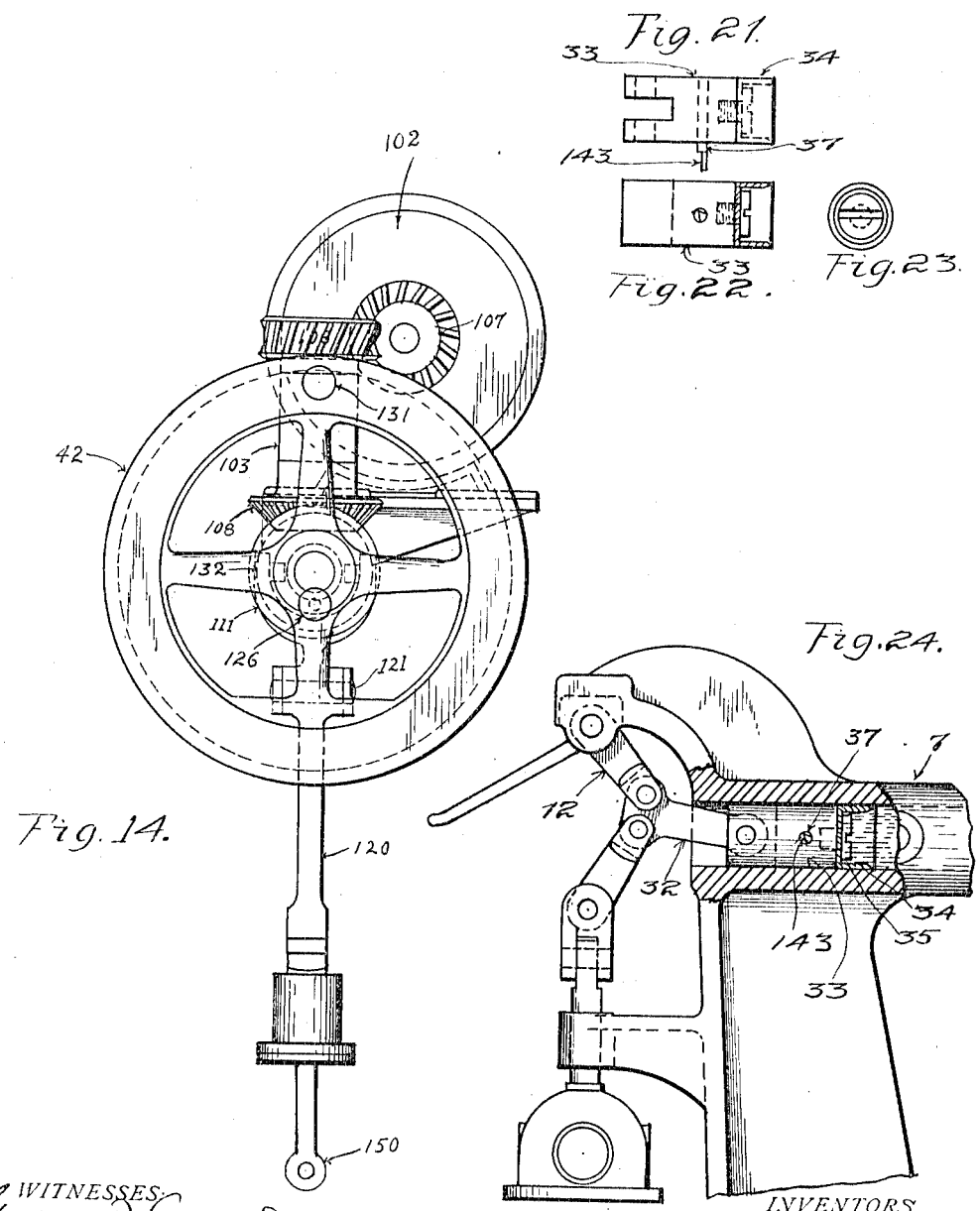

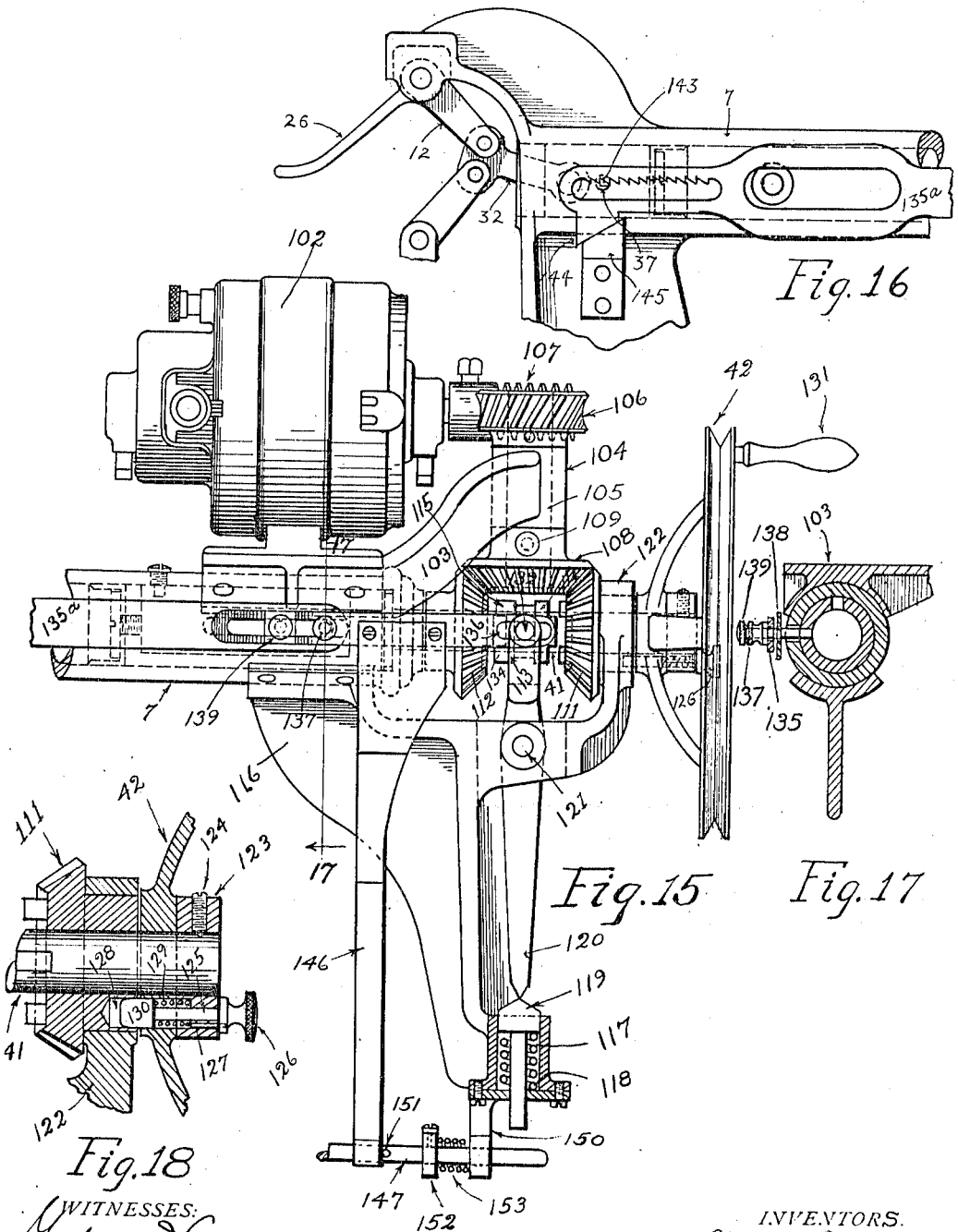

W. H. & C. W. PUTNAM.
STRENGTH TESTING MACHINE FOR SHEETS AND FABRICS.
APPLICATION FILED JAN. 16, 1912.
1,116,118.
Patented Nov. 3, 1914.
10 SHEETS—SHEET 8.
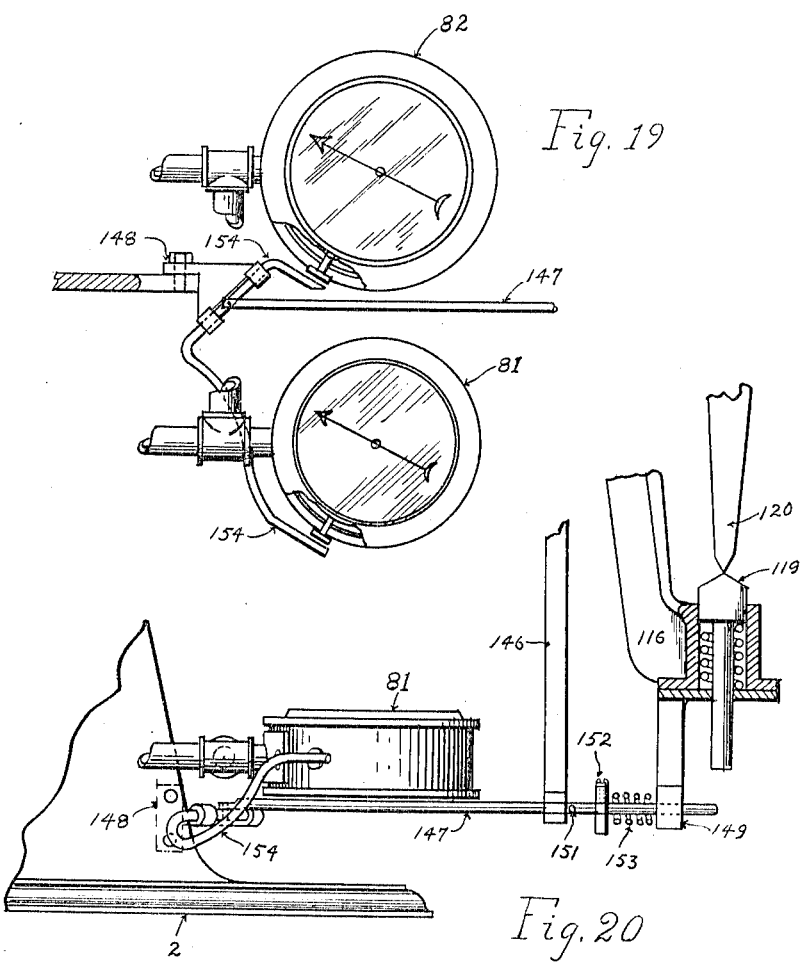

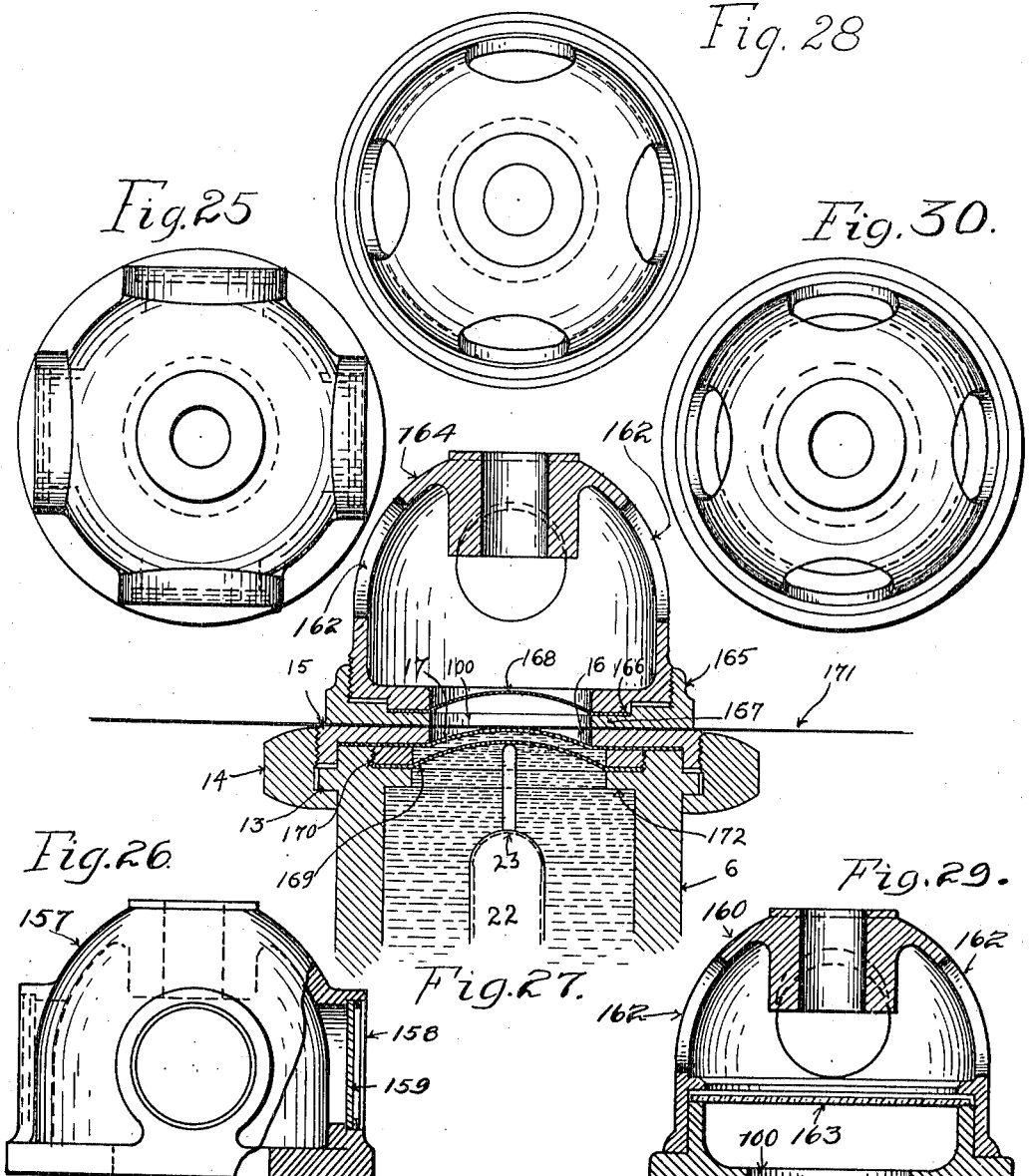

W. H. & C. W. PUTNAM.
STRENGTH TESTING MACHINE FOR SHEETS AND FABRICS.
APPLICATION FILED JAN. 16, 1912.
1,116,118.
Patented Nov. 3, 1914.
10 SHEETS—SHEET 10.
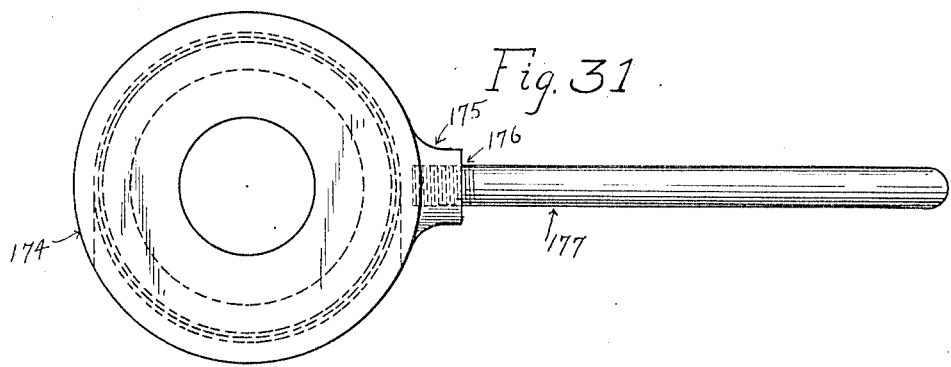
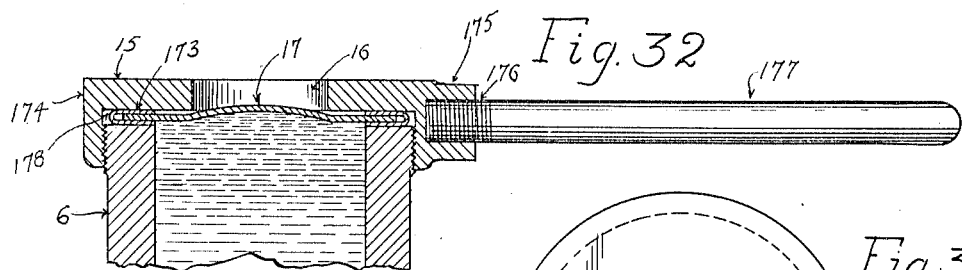
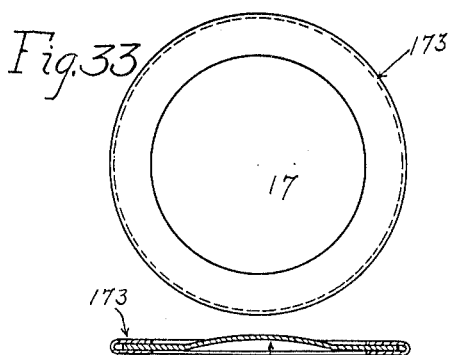
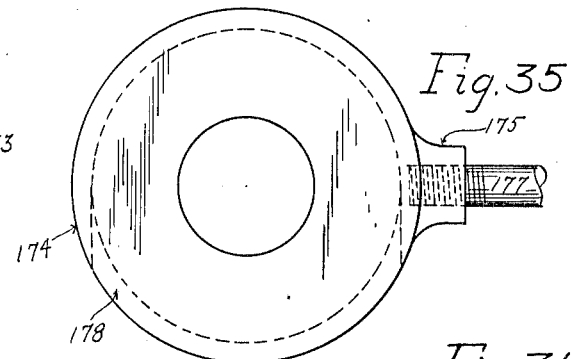
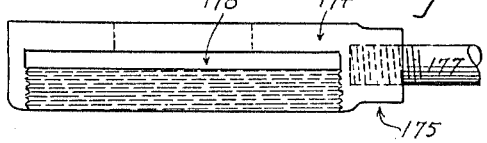

UNITED STATES PATENT OFFICE.

WILLIAM H. PUTNAM, OF NEW YORK, N. Y., AND CLESSON W. PUTNAM, OF HOLYOKE, MASSACHUSETTS, ASSIGNORS TO B. F. PERKINS & SON, INC., OF HOLYOKE, MASSACHUSETTS, A CORPORATION.

STRENGTH-TESTING MACHINE FOR SHEETS AND FABRICS.

1,116,118.  Specification of Letters Patent.  Patented Nov. 3, 1914.

Application filed January 16, 1912. Serial No. 671,495.

*To all whom it may concern:*

Be it known that we, WILLIAM H. PUTNAM and CLESSON W. PUTNAM, citizens of the United States, and residents of the city, county, and State of New York, and Holyoke, county of Hampden, and State of Massachusetts, respectively, have invented certain new and useful Improvements in Strength-Testing Machines for Sheets and Fabrics, of which the following is a specification.

This invention relates to improvements in apparatus for testing the strength of sheet materials, such as paper, sheet metal, textile or knitted fabrics, leathers, celluloids, and the like, all of which are designated hereinafter under the generic term of fabric, by determination of the maximum capacity of the fabric for resisting strains or pressures imparted transversely thereof.

The object of this invention is to provide a machine with fabric supporting, apertured platforms (there being one or more platforms as desired) each aperture being preferably provided with an elastic diaphragm above the fluid chamber and this fluid chamber is connected to a common pressure-producing cylinder for producing a pressure that will distend the diaphragms. The pressure-producing means preferably includes a pair of plungers in a suitable cylinder, one of the plungers being connected to the clamping mechanism and the other to a source of power which may be either automatically or manually controlled and operated so that the machine may be automatic in its action and leave the operator nothing to do after turning on the power but insert and remove the fabric to be tested and to read the pressure gages.

A further object is to cause the fabric to be clamped gradually and firmly and with a pressure proportionate to the pressure in the chamber.

Another object is to prevent a too rapid flow of fluid to the fluid chamber so that the fabric in our apparatus will not be subjected to irregular, uncertain and uneven strains.

A still further object is to provide an automatic mechanism for releasing the pressure gages so that their needles will, at the appropriate time, return to zero and be ready for another test.

Yet another object is to provide means for preventing the overflow of liquid in the event that a diaphragm breaks.

Still a further object is to provide suitable valves by means of which two or more gages can be connected to one chamber for the purpose of comparison so that errors may be detected, or through one of the gages being constructed to accommodate low pressure readings, and the other gage to accommodate readings of high pressure, our machine performs the work heretofore requiring the use of two machines.

These and other objects are all accomplished by our improved apparatus, some embodiments of which are hereinafter set forth.

Figure 2:
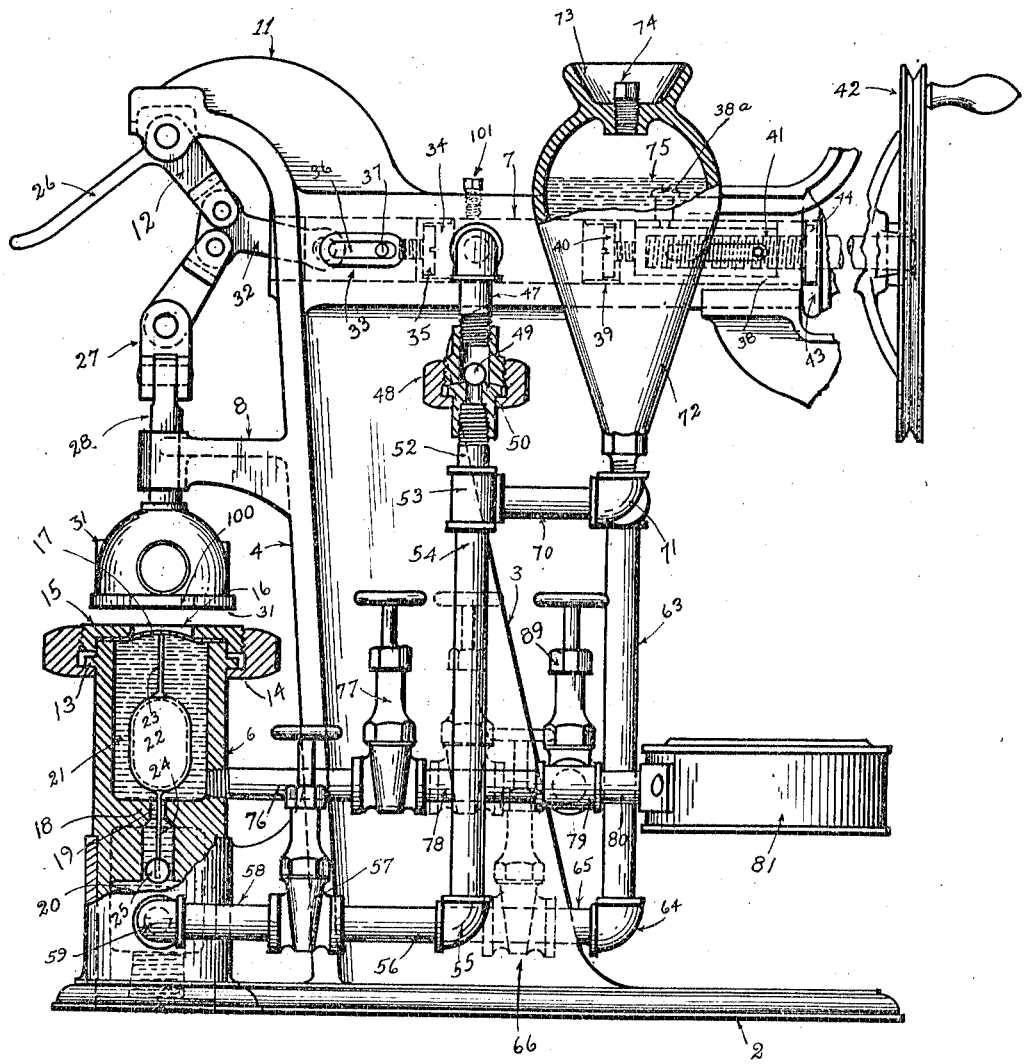
Figures 9, 10:
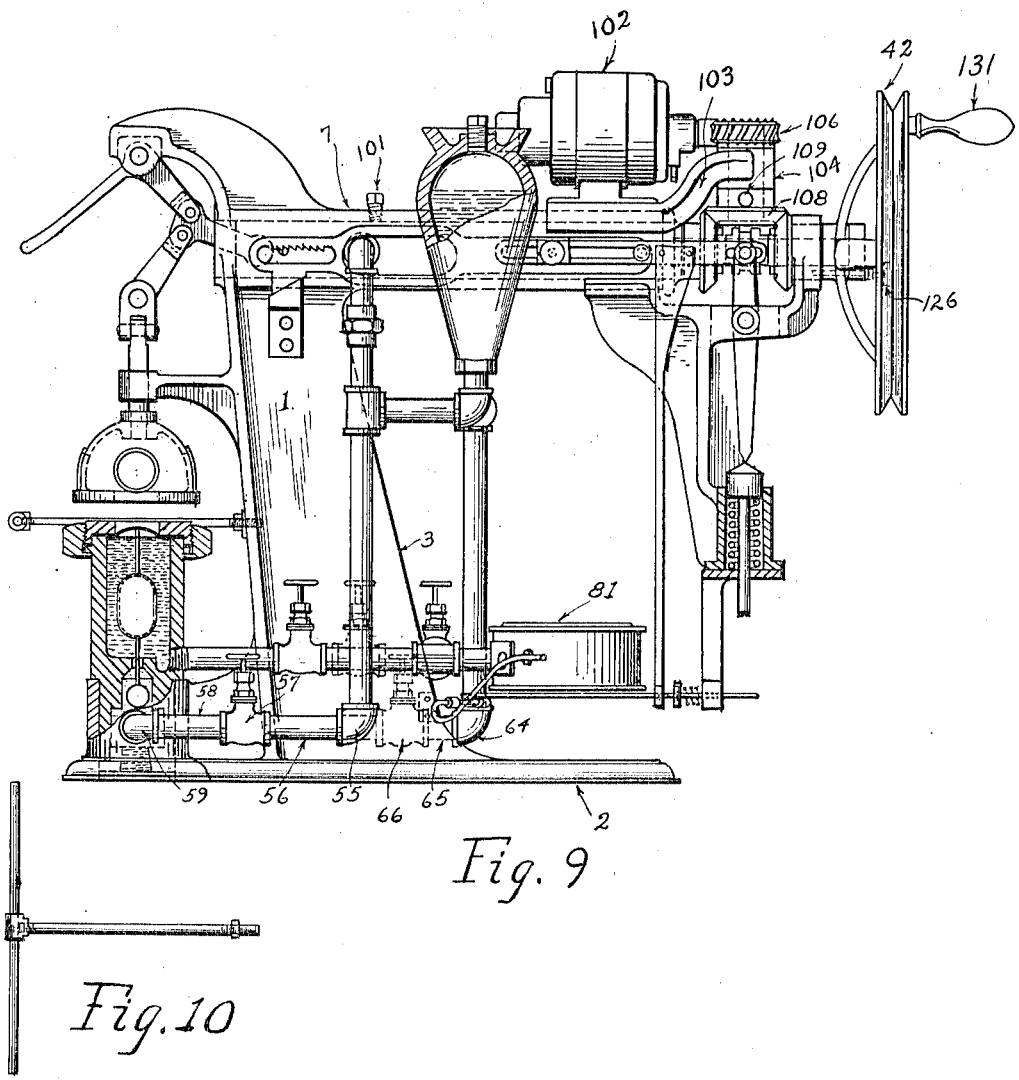

For a more particular description of our invention, reference is to be had to the accompanying drawings, forming a part hereof, in which:

Figure 1 is a front elevation of a machine embodying some of our improvements. Fig. 2 is a side elevation of the same. Fig. 3 is a plan view partially in section of this machine. Fig. 4 is a plan view of a portion of an automatic machine. Figs. 5, 6, 7 and 8 are detailed views showing a valve for preventing the too rapid flow of liquid into the fluid chamber. Fig. 9 is a side elevation of an automatic, power-operated, testing machine which may also be used with manual power, if desired; and Fig. 10 shows a fabric-supporter for the same. Fig. 11 is a side elevation of a single chamber power-operated machine, and Fig. 12 shows a fabric-supporter for the same. Fig 13 is a plan view of a pair of gages used in Fig. 11 and shows the releasing mechanism. Fig. 14 shows a portion of the mechanism for applying power to the apparatus. Fig. 15 shows a portion of the pressure-releasing mechanism and other parts and is taken at right angles to Fig. 14. Fig. 16 shows a portion of the clamping mechanism. Fig. 17 is a sectional view taken on the line 17—17 of Fig. 15 looking in the direction of the arrow. Fig. 18 is a sectional view of Fig. 15 looking in the direction of the arrow, showing the band wheel connected to the collar and screw shaft. Figs. 19 and 20 are plan and side elevations, respectively, of the pressure gage releasing mechanism. Figs. 21, 22 and 23 are plan, side and end views of a piston which is connected to the clamping mechanism, parts of Fig. 22 being shown in section. Fig. 24 is a side elevation, partially in section, of a part of the clamping mechanism. Figs. 25 and 26 are plan and side views, respectively of the bell for the clamp. Fig. 27 is a sectional view of a modified form of clamp and a part of the mechanism connected therewith, including a double diaphragm. Fig. 28 is a plan view of this clamp. Figs. 29 and 30 are sectional and plan views, respectively of a still further modification. Fig. 31 is a plan view of a modified form of diaphragm holder. Fig. 32 is a sectional view of the same. Fig. 33 is a plan view of a ring containing a diaphragm. Fig. 34 is a sectional view of the same. Figs. 35 and 36 are plan and side views, respectively, of the clamp shown in Fig. 31.

Throughout the various views of the drawings, similar reference characters designate similar parts.

In the embodiment of our invention herein set forth in Figs. 1, 2 and 3, two fluid chambers and the incidental testing mechanisms are shown. It is obvious that more or less of these chambers may be employed, as desired, and that the structure will be correspondingly changed, in a manner that is obvious. The frame 1 rests on a base 2 which supports two vertical webs 3 and 4, respectively, and the fluid chambers 5 and 6. The web 3 carries a horizontally disposed compression cylinder 7. From the web 4 extends a perforated bracket 8 with two perforations in the bosses 9 and 10 respectively, the perforations having a common axis with their respective cylinders 5 and 6. Over the bracket 8 and extending upwardly from the cylinder 7 is a projection 11 to which a toggle 12 is connected in a manner which will be described below. The cylinders 5 and 6 which are provided with a suitable annular collar 13 near the upper end of each, and each collar 13 engages a flange on an annulus or nut 14 which extends upwardly as shown. The interior of this annulus 14 is screw-threaded and secured to a smaller disk 15 by screw-threads. The disk 15 has a central perforation 16 and a laterally and downwardly extending flange which embraces the top of the cylinder to which it is attached. This disk 15 may be regarded as a packing ring in that it holds a diaphragm 17 against the top of the cylinder to which it is attached. The annulus 14, the collar 13, the disk 15 and the diaphragm 17 are all combined and arranged with their respective cylinders as shown, so that by turning the annulus 14, the diaphragm 17 may be clamped or unclamped, as desired. Below the diaphragm 17 and at a suitable distance, say half-way down, each cylinder 5 and 6 is provided with an inwardly extending and perforated collar 18 which has a perforation 19 of two different diameters connected by a taper to form a valve seat as will appear below. Below the collar 18 and connecting with the perforation 19 is a chamber 20 which has its lower end closed by a screw-plug or any other suitable means. Above the collar 18 is a suitable chamber 21 in which is placed a float 22 with a bar or projection 23 at its upper end which normally rests against the diaphragm 17, and at its lower end is a second projection 24 to the bottom of which is secured a ball 25. The purpose of this float and its connecting parts is to provide mechanism for immediately closing the perforation 19 with a water-tight joint when the material under test breaks and this is done by having the float 22 follow the upward direction of the fluid which rises coincidentally with the diaphragm as the fabric under pressure expands and bursts, through the hole 16 and inside the base-ring aperture 100 of the clamp 31, and as the float 22 rises it carries the lower ball 25 against the conical valve seat in the opening 19 thereby preventing any more liquid from flowing into the fluid chamber 21 and simultaneously cutting off the pressure from the individual pressure gage 81 connected by piping to the upper chamber 21, the needle of the gage recording the pressure exercised at the instant the fabric bursts. This same described closing of the conical seat in the opening 19 by the impact of the ball 25 as it follows the lift of the float 22, would, in the instance of the diaphragm 17 being itself broken or punctured (as is sometimes the case with the unusually high pressure or with a much-worn diaphragm) likewise be effectual in the capacity of a safety appliance for preventing the spilling of the fluid into the atmosphere, by closing the lower chamber 20 from the upper chamber 21, thus preventing the fluid from being forced out of the cylinders by the action of the pressure plunger in pressure chamber 7. The toggle 12 is provided with a handle 26, as shown by means of which the toggle may be shifted so as to raise or lower an equalizing cross-bar 27 to which it is connected with a pivotal joint and this cross-bar has downwardly extending shafts 28 and 29 which pass through the perforations in the boxes 9 and 10 respectively, and at their lower ends carry clamps 30 and 31 against the disks 15 or against the fabrics which are placed between these clamps and these disks whereby the fabrics are clamped securely pending further clamping in a manner which will now be described. The toggle 12 has a projecting member 32 which engages a suitable piston 33 provided with the conventional packing 34 which is held by a screw 35. A slot 36 with a pin 37 passing through this slot and from the piston 33 prevents the piston from turning and limits its movement in the direction of its axis. This piston 33 closes one end of the cylinder 7. The other end of the cylinder 7 is closed by a corresponding piston 38 which is also provided with a packing 39 held by a screw 40, in the conventional manner, and this piston 38 has a screw 41 which carries a hand-wheel, or similar device 42 on its outer end, and the screw passed through a suitable boss 43 which prevents the screw from moving in the direction of its length, a suitable annular collar 44 being provided for this purpose, so that by turning the hand-wheel 42 in one direction, or the other, the piston 38 is moved toward or away from the piston 33, the piston 38 moving as a nut on the screw 41. A suitable screw $38^a$ passes through the walls of the cylinder 7 and prevents the piston 38 from turning about its axis. This structure causes the fluid in the chamber 7 to press against the piston 33 and force it outwardly whereby the toggle 12 is correspondingly shifted with a force proportionate to, but preferably greater than the pressure on the piston 33 with the result that the fabric is clamped with a much greater pressure than the pressure in the cylinder 7 when the apparatus is in use, and a fabric is undergoing a test. Moreover this pressure on the fabric is uniform and progressively increases and is always greater than the pressure on the diaphragm 17 in the best embodiment of our invention, as will appear below. A pipe 45 runs horizontally from the fluid cylinder 7 to an elbow 46 which is connected with a vertically disposed pipe 47 that runs to a union 48. This union 48 is of the usual construction except that it is provided with a ball 49 and a seat 50 on which this ball rests, the seat 50 having a small slot 51, as shown in Figs. 7 and 8, so that liquid can always leak by the ball 49, but cannot leak rapidly. This simple valve prevents excessive flow of under pressure liquid from the cylinder 7 to the cylinders 5 and 6 and effectively protects the diaphragm 17 and the fabric under test from premature pressure due to an excessive angular velocity of the power or hand-wheel 42. From the union 48 a small pipe 52 runs to a T 53 and from the lower end of the T a pipe 54 runs to an elbow 55 and from thence, a horizontally disposed pipe 56 runs to a hand-valve 57. Another horizontal pipe 58 runs to an elbow 59 which in turn is connected to a stud pipe 60 that runs to the cylinder 6 below the annular collar 18, and into the chamber 20. A similar set of pipes connects the cylinder 5 with the reservoir 72, which will be described below, the exact connection being as follows, to wit: A horizontal pipe 61 runs to an elbow 62 which connects with a vertical pipe 63 which runs to an elbow 64 which is connected by a short pipe 65 to a hand-valve 66 which is connected to a pipe 67 that runs to an elbow 68 which is connected to a stud pipe 69 that runs into the chamber 20 of the cylinder 5. A third pipe 70, which is horizontally disposed runs from the T 53 to a three-flanged elbow 71 which is connected to a reservoir 72 with a cup 73 at its upper end which is closed by a screw 74. The object of this cup is to provide a simple means for filling the reservoir or fluid-chamber 72, as well as the entire system of pipes, cylinders, etc., the vent hole 101 opened and closed by a screw on cylinder 7, facilitating this operation. It will be noted that the fluid or liquid 75 which is in the apparatus does not completely fill the reservoir 72, but leaves an air space above so that an elastic medium is provided for forcing fluid through the pipes and cylinders of the apparatus to immediately take up the displacement of fluid under each diaphragm as the fabric under test bursts. This ejection of fluid from the reservoir 72 equalizes and sustains the continuous pressure on the gages which continue to turn the needles without interruption except to the gage connected with the cylinder under the diaphragm that first bursts the fabric. This same ejection of fluid accelerates the upward movement of the floats coincident with the upward movement of the diaphragms above, and when the bursts take place, the ball seats below the floats close automatically and as a result, stop the movement of the needles of the gages correspondingly, thus giving a true record of the pressure at the time of the burst. If only one fluid chamber is employed this reservoir may be omitted, but its use is preferable under all circumstances. The cylinder 6 has a suitable pipe 76 extending from its chamber 21 to a hand-valve 77 and from thence a pipe 78 runs to a T 79 which is connected to a pipe 80 that runs to a pressure gage 81. A second and similar pressure gage 82 is connected to a pipe 83 that runs to a T 84 that has one pipe 85 connecting it with the T 79 and a second pipe 86 connecting it with a hand-valve 87 that runs to a pipe 88 which reaches the cylinder 5 and connects its chamber 21 with the gage 82. The pipe 85 has a hand-valve 89 placed therein which is normally closed, but which may be opened so as to connect the gage 81 with either cylinder or both cylinders or to connect gage 82 with either cylinder or with both cylinders, thus, by the closing of the proper hand-valves, both gages may be connected with one diaphragm chamber. The frame 1 also carries a suitable band or fabric support 90 which runs from one side to the other and surrounds the disks 15 and annuluses 14 as shown in Fig. 3. At its ends it is secured to the frame 1 or pipes in any suitable manner, its purpose being to support the fabric being tested so that this fabric will lie smooth and straight while clamped and not be distorted or folded or creased.

In the foregoing has been described a structure in which manual power is applied for making the tests. A more complicated structure, but one giving more accurate and prompt results is shown in Figs. 9 and 11, and the details are shown in the other figures as will appear below. In the structure shown in Figs. 9 and 11 a motor 102 is placed on the cylinder 7 and not far from the rear of the same and a suitable bracket 103 runs from the motor support and is provided at its end with a vertical bearing 104 in which is mounted a vertically disposed stud shaft 105. The upper end of the shaft 105 is provided with a worm-gear 106 that meshes with a worm 107 on the armature shaft of the motor 102. The lower end of the shaft 105 carries a bevel gear 108 which is loosely mounted thereon except that it may be fixed thereto by means of a pin 109, which passes through suitable perforations in the shaft 105. This pin 109 fixes the gear 108 in substantially the same way the gear 111 is fixed to the wheel 42 in the description given below and shown in Fig. 18. The precise details are not important provided they are sufficient as the device is the well-known pin and hole connection which is common in structures of this kind. The gear 108 meshes with both of two identical and oppositely disposed bevel gears 111 and 112, both of which are mounted on the screw shaft 41 and revolve freely thereon so that in the absence of a clutch, the motor 102 could not drive the screw 41. However, a clutch 113 is keyed to the screw 41 and slides thereon in the direction of the length of the screw, and this clutch 113 has projections 114 which are adapted to engage with corresponding projections on the gear 111, and also similar projections 115 adapted to engage with corresponding projections on the gear 112. This shifting of the clutch 113 is brought about by mechanism which will be described below. In the mid-position of the clutch the motor 102 does not drive the screw-shaft 41 and when the clutch 113 engages the gear 111 power is applied to force the plunger 38 against the fluid and when power is applied to the gear 112 power is applied to withdraw the plunger 38 from the fluid. A suitable bracket 116 is secured to the cylinder 7 and this bracket extends downwardly to form a spring-seat 117 which contains a coiled spring 118 that presses a small plunger 119 and holds the same against the lower end of the lever 120 of the clutch 113. This lever is fulcrumed on a pin 121 in the bracket 116. A further extension of the bracket 116 contains a bearing 122 through which the outer end of the screw 41 is passed and receives a hand-wheel or band-wheel 42. This band-wheel is connected to a collar or boss 123 which is held on the screw shaft 41 by means of a set screw 124 or other suitable means. A suitable pin 125 with a head 126 from which protrudes a parallel pin 127 passes from this collar 123 and into an opening 128 in the gear 111 which is journaled in the bearing 122, and incidentally passes through a corresponding opening in the wheel 42 as shown in Fig. 18. A coiled spring 129 tends to keep the enlarged head 130 of the pin 125 in the opening 128 and maintains the head in this position so as to lock the wheel 42 to the shaft 41 except when the pin 125 is withdrawn and twisted so that the small pin 127 rests against the boss or collar 123.

From the foregoing it is apparent that our improved machine may be run either from a motor, a belt or cord or a handle 131 on the wheel 42. The clutch 113 has a spitable pin 132 running laterally through the lever 120 and enterng a recess 133 of the clutch collar 134 which is placed on the screw-shaft 41. The teeth 114 and 115 are at the ends of this collar 134 and a second pin corresponding to the pin 132 is on the other side and opposite this pin 132 so that the lever 120 will slide the collar 134 either way in the conventional manner.

A slide 135 for reversing has a suitable slot 136 near its rear end through which the pin 132 passes. This slot 136 is for the purpose of permitting a limited movement of the slide 135 when shifting the clutch 113.

The piston 38 has a pin 137 projecting through a slot 138 in the slide 135 and this pin 137 also extends through the wall of the cylinder 7, a suitable slot being made for this purpose. This pin 137 is adapted to impinge against an adjustable stop 139 which is mounted in any suitable way on the slide 135 so that this stop may be shifted one way or another in the slot 138 so as to limit the movement of the pin 137 in this slot. The reason for this will appear below. A second slide 135ª also has a slot 138ª engaging the pin 137 and this slide 135ª extends toward the front of the machine. At 140 the slide 135ª is widened and slotted so as to pass free and clear of the pipe 45 and from thence this slide 135ª extends so as to form yet another slot 141 with teeth 142, on its upper surface. These teeth 142 are adapted to pass freely over a pin 143 triangularly shaped on its external extremity and extends through the cylinder 7 and from the piston 33 so that when the piston 38 is compressing the fluid and moves from the piston 33 there is no interference between this piston and the slide 135ª. However, this is not the case when the piston 38 moves in the opposite direction for then the teeth 142 drag the pin 143 so that the piston 33 is moved toward the piston 38. However, this movement of the piston 33 through the pin 143 is not long continued because the slide 135ª has an inclined cam 144 which rides upwardly on a corresponding cam 145 fixed to the frame 1 in any suitable manner, and after the piston 33 has moved far enough to release the clamps 30 and 31 the pin 143 is disengaged from the teeth 142.

From the foregoing description of the slide 135 and its action it is apparent that when the machine is started after being idle it is started by grasping the pin 139 and shifting the slides 135 and 135ª toward the rear of the machine until the clutch 113 is thrown into engagement with the bevel gear 111. As soon as this occurs, assuming the motor 102 to have been in operation and driving the bevel gear 108, the shaft-screw 41 is driven so as to force the plunger 38 to move inwardly and this movement continues until the pin 137 strikes the stop 139 in the slot 138 and then the clutch 113 is shifted so as to engage with the bevel gear 112 and the shaft-screw 41 rotates in the opposite direction, reversing the motion of the plunger. While the slide 135 was moved toward the front of the machine—that is to the left, in Figs. 9 and 11, the piston 33 was not influenced thereby. As soon as the slide moves in the opposite direction the piston 33 is withdrawn as above described sufficiently to release the clamps 30 and 31. The operation just described is not completely described because there might be trouble in causing the clutch 113 to engage with one or the other of the bevel gears 111 and 112 if means were not provided to force a positive engagement. This means is found in the plunger 119 and its connections. This plunger 119 is wedge-shaped at its upper surface and engages a corresponding wedge at the lower end of the lever 120 with the result that the clutch 113 is positively forced with more promptness into engagement with one or the other of the bevel gears 111 and 112.

As the machine to be most efficient must be entirely automatic except for the placing and removal of the fabric under test and the reading of the pressure gages, mechanism has to be provided for releasing the needles at the proper time after each test, so that they will return to zero. It is preferable to so time this releasing mechanism that the needles will return to zero immediately before the beginning of each test so as to allow a maximum time for reading the gages after each test. This result is accomplished by our improved mechanism in the following manner: The slide 135 carries a depending arm 146 secured to this slide at any suitable point as near the slot 138 and between this slot and the slot 136. This arm 146 is perforated at its lower end and slides freely on a rod 147 mounted in suitable bearings 148 and 149. The bearing 148 is preferably fixed to the frame 1 of the machine and the bearing 149 is in a hanger 150 mounted on the lower end of the bracket 116. The arm 146 engages a pin 151 on the rod 147 and this rod also carries a suitable collar 152 which is fixed thereto and separated from the bracket 150 by a coiled spring 153 as shown. This coiled spring 153 when not compressed keeps the rod 147 in its normal position, and when compressed tends to restore this rod to its normal position. This spring is compressed when the rod 147 is shifted toward the rear of the machine by the action of the depending arm 146, and when the apparatus is made as shown in Figs. 15, 11 and 9 this spring 153 is compressed just before the clutch 113 engages the gear 111. The rod 147 has cams 154 fixed thereon and these cams are so arranged and disposed that they will press the release buttons 155 of the pressure gages when the spring 153 is compressed and not otherwise. The position of the cams is determined by the particular location of the pressure gages and may be varied as conditions require.

In Fig. 11 two pressure gages are shown and only one testing chamber. Fig. 9 shows a duplex machine with two testing chambers only one of which is shown. In Fig. 11 the valve mechanism in the pressure chamber has been omitted and it can be dispensed with because the bursting of a diaphragm will not interfere with the cylinders although it is better to employ it because of the leakage which it prevents. However, when a clamp of the character shown in Figs. 25 and 26 is employed this difficulty is greatly reduced because any liquid that escapes will escape into the bell of the clamp where it will do no harm. These bells 30 and 31 each consist of an annulus 156 from which extends a dome portion 157 which is provided with windows 158 the glass of which is secured by suitable spring rings 159 or any other suitable means, the top of the dome is perforated and screw-threaded or otherwise shaped so as to receive the rod 28 or the rod 29 and fit the same.

In Figs. 27 and 28 is shown a modified form of clamp and diaphragm arrangement. Here the clamp 164 is made substantially bell-shaped with suitable perforations 162, and at its lower end is secured to an annulus 165 by screw-threads, as shown. The bell 164 has a flat collar 166 which coöperates with a corresponding portion 167 of the annulus 165 to clamp a diaphragm 168 which is upwardly arched to show that it is a diaphragm. The chamber which is provided with a reinforcing diaphragm 169 which is sandwiched in between a collar 172 and a packing ring 170 and the space between the reinforcing diaphragm 169 and the diaphragm 17 is preferably filled with liquid identical with that below the diaphragm 169 so that when the fabric 171 is tested, the two diaphragms 17 and 169 will reinforce each other. If both should burst, as is possible, the float 22 will pass through the perforations thus made and force the diaphragm 168 and will shut off the pressure as above explained. The diaphragm 168 will then serve the function of preventing liquid from escaping through the opening 100.

In the structures shown in Figs. 29 and 30 the bell 160 is united to an annulus 161 in any suitable manner and has suitable openings 162. A glass plate 163 is sandwiched in between a suitable shoulder in the bell 160 and one on the annulus 161 so that if a diaphragm breaks, liquid will not be squirted beyond the bell 160 and the glass 163.

In Figs. 31 to 36, inclusive, are shown the details of a diaphragm and a construction of the corresponding parts so that the diaphragm may be removed or replaced with great rapidity. Here the diaphragm 17 is surrounded by an annular ring 173 which is preferably made of brass or some such material and shaped as shown in Figs. 33 and 34. The chamber 6 is provided with a clamping ring or annulus 174 which is screw-threaded and provided with a boss 175 which engages screw-threads 176 on the handle 177. A slot 178 extends through the walls of the clamp 173 so that the diaphragm 17 with its ring 173 may be shoved through said slot. When this modification is in use, by shoving the handle 177 a slight distance in one direction the clamp 174 is raised sufficiently for the removal or replacement of the diaphragm 17 through the slot 178. By reversing this movement of the handle 177, the diaphragm is again clamped in place.

Operation: In view of the foregoing operation our machine will be readily understood. Assuming that the motor 102 is to be used for driving the apparatus, the stop 139 is set in the slot 138 at what is known to be beyond the breaking point of the fabric under test. That is if the strength of the fabric is unknown the stop 138 is set at the extreme left of the slot 138, the fabric is put in place, the handle 26 of the toggle 12 is thrown upwardly and the fabric is thereby clamped, the motor is started and the slide 135 is shoved toward the rear of the machine,—that is to the right of Fig. 11. Until the clutch 113 engages the gear 111 the action of the machine from then on is automatic except for the insertion and removal of the fabric and the reading of the gages. Liquid under pressure is forced by the plunger or piston 38 through the pipes to the testing chamber or chambers and there the cylinder 7 and the diaphragm or diaphragms are forced against their respective fabrics, and this pressure is continued until each fabric bursts. As the pressure increases on the piston 28, the fluid which is practically inelastic, presses against all parts of the apparatus with which it comes in contact at the same pressure and the piston 33 is forced outwardly so that the toggle 12 causes the bell clamps 30 and 31 to press against the fabric in a progressively increasing pressure which is proportionate to, but greater than the pressure of the fluid in the apparatus. The fabric bursts at the time where its strength is exhausted and the bursting pressure per square inch is indicated by the gage or gages as the case may be. In Fig. 11 two gages are shown connected to one chamber, but one gage with one chamber may be used if desired as shown in Fig. 3. The bursting of the fabric does not stop the apparatus as the piston 38 continues to move until its projection 137 comes in contact with the stop 139 and causes the slide 135 to be shifted to the left thereby throwing the clutch out of engagement with the gear 111 and into engagement with the gear 112 and then the reverse movement begins and continues until the pin 137 comes in contact with the end of the slot 138 at which time the slide 135 is moved toward the right, that is to the rear of the machine, and then the clutch 113 again engages the gear 111 and this cycle is repeated indefinitely. The cams 155 act as above described so as to restore the needles to zero just before the slide 135 ends its return movement and causes the clutch 113 to engage the gear 111. If its power is derived through the grooved-wheel 42 instead of the motor 102, the shaft 105 is disconnected from the gear 108 by withdrawing the pin 109 as above described. The pin 126 is then inserted so as to engage the gear 111 as shown in Fig. 18 and then the device will operate the same as above described. If power is not available the machine may still be operated by the wheel 42 or the handle 131 and then it operates the same as the machine shown in Figs. 1, 2 and 3, except that in any event the wheel 42 always runs in one direction. By manipulating the valves 57, 66, 77 and 87, one or more of the testing chambers and one or more of the pressure gages may be cut out of the apparatus for the time being and the tests may be continued with the remaining elements. When the structure shown in Figs. 2 and 9 is employed the bursting of a diaphragm in one testing chamber will not interfere with the tests in other chambers as the floating valve in the chamber immediately shuts off the liquid under pressure so that none can be squirted from the apparatus.

While we have shown and described some embodiments of our invention, it is obvious that it is not restricted thereto but is broad enough to cover all structures that a diaphragm is one testing chamber will come within the scope of the annexed claims.

Having described our invention, what we claim is:—

1. In a device of the class described, a compression cylinder and a fluid testing chamber in communication with said compression cylinder, means for holding a specimen on the fluid testing chamber, and automatic means for creating and releasing pressure in the compression cylinder, controllable by the pressure exerted in said cylinder.

2. A fluid testing chamber, clamping mechanism for holding a specimen against said fluid testing chamber, a compression cylinder having communication with the testing chamber and automatic means including the compression cylinder for causing pressure on the clamping mechanism and in the fluid testing chamber.

3. A fluid testing chamber, clamping mechanism for holding a specimen against said fluid testing chamber, a compression cylinder having communication with the testing chamber, and automatic means including the compression cylinder for creating and releasing pressure on the clamping mechanism and in the fluid testing chamber.

4. In a device of the class described, a frame, a fluid chamber covered by a diaphragm, a fluid compression cylinder connected to said fluid chamber, a clamp for holding the fabric over said fluid chamber while the same is being tested, and means for connecting the clamp with the fluid in the cylinder so that the clamp is pressed against the fabric being tested with a pressure proportionate to the pressure in the fluid chamber and cylinder and compression means for exerting pressure on fluid in the fluid cylinder.

5. In a machine of the class described, a frame carrying a fluid chamber and a pressure cylinder and pipes connecting the same, a piston at one end of said pressure cylinder and means for moving the piston so as to press the fluid in said cylinder, a clamp, a toggle joint, a movable piston at the other end of said cylinder and means for connecting said toggle joint and last-mentioned piston so that when a fabric is tested over the fluid chamber this fabric is clamped with a pressure proportionate and in excess to that of the pressure in the fluid chamber.

6. In a testing machine, a fluid chamber over which the fabric is tested, a fluid receiving hood clamp movable above the fluid chamber, and adapted to confine fluid discharged from said chamber over said chamber, a diaphragm secured over the fluid chamber and means for supplying fluid under pressure to the fluid chamber to disrupt a fabric held thereover.

7. In a machine of the class described, a frame carrying a fluid chamber and a compression cylinder and pipes connecting the two, a diaphragm over said fluid chamber and means for holding the same in place, a float in said fluid chamber, and means connected therewith adapted to shut off the flow of liquid in said chamber when the diaphragm bursts, or when a fabric bursts under test.

8. In a device of the class described, a frame, carrying a compression cylinder and a fluid chamber connected by pipes, a diaphragm over said chamber and means in said chamber normally bearing against said diaphragm for shutting off the supply of liquid thereto when the diaphragm bursts, so that spilling or forcing of fluid from the chamber is prevented.

9. In a device of the class described, a frame carrying a compression cylinder and a fluid chamber and pipes connecting the same, means for clamping a fabric over said chamber and an independent support carried by the frame and partially surrounding said chamber so that the fabric may be held true over the testing chamber when tested in the apparatus.

10. In a device of the class described, a frame, a plurality of fluid chambers carried by said frame, and a cylinder, pipes connecting the chamber with said cylinder, a clamp for each chamber, an equalizing bar connecting said clamps and means connecting said equalizing bar with the cylinder so that a pressure is exerted on the clamps proportionate to the pressure in the fluid chamber whenever the device is in use.

11. In a device of the class described, frame carrying a plurality of fluid chambers and a compression cylinder and pipes connecting each of said chambers with said cylinder, a diaphragm on each chamber, and means for securing the same in place, a clamp over each chamber and an equalizing bar connecting said clamp, a toggle between said equalizing bar and frame and means connecting said toggle with the fluid in said cylinder so that when the device is in use, a pressure is exerted on the clamps which is proportionate to the pressure of the fluid in the apparatus.

12. In a machine of the class described, a plurality of fluid chambers, a compression cylinder, pipes connecting said chambers and cylinder, means for clamping fabrics over said chambers, and a gravity reservoir connected to said pipes whereby liquid is supplied for the apparatus.

13. In a device of the class described, a frame, carrying a compression cylinder and a plurality of testing chambers, means for clamping fabric on each of said testing chambers, pipes connecting said cylinder with each of said chambers, and gages connected to said pipes and valves so that any of the gages or all the gages may be connected with any or all of the chambers.

14. In a device of the class described, a fluid chamber with a diaphragm on its upper end, a clamp for holding a fabric over said diaphragm, a toggle adapted to force said clamp against a fabric and holding the same over said diaphragm, a handle for actuating said toggle, means for exerting pressure on fluid in said chamber adapted to actuate said toggle.

15. In a device of the class described, a frame carrying a compression cylinder and a testing chamber and pipes connecting the two, a clamp over said chamber, a toggle for forcing said clamp against a fabric over said chamber, a piston in said chamber, a link connecting said piston and toggle and means for preventing the piston from moving in an angular manner about its axis and limiting the movement of said piston in the direction of its axis.

16. In a device of the class described, a compression cylinder and a testing chamber, a pair of pistons in said cylinder and mechanical means connecting the pistons to move both pistons in the same direction when pressure is released.

17. In a machine of the class described a frame carrying a compression cylinder and a testing chamber and pipes connecting the two, a compression plunger in said compression cylinder, power applying means, and connections between said plunger and said power applying means whereby the plunger may be automatically reversed to decrease the pressure in the testing chamber.

18. In a machine of the class described, a frame carrying a compression cylinder and a testing chamber and pipes connecting the two, a compression piston in said cylinder, a screw-shaft connected to said piston and adapted to move the same in either of two directions, floating gears mounted on said screw-shaft and a clutch to engage either of said gears so that said shaft may be driven in either of two directions.

19. In a device of the class described, a frame carrying a compression cylinder and a testing chamber and pipes connecting the two, a compression piston movable in said cylinder, a screw-shaft engaging said piston and adapted to move the same in either of two directions, a sliding collar mounted on said screw-shaft and adapted to engage either of two floating gears running idle thereon, a lever engaging said collar and adapted to shift said collar in the direction of its length so that it will engage either of said gears and a spring actuated plunger adapted to engage said lever and free it abruptly in one direction or the other and means for supporting said spring actuated plunger.

20. In a device of the class described, a frame carrying a compression cylinder and a testing chamber and pipes connecting the two, a compression plunger or piston in said compression cylinder, a slide and clutch mechanism connected to said plunger and a screw-shaft connected to said plunger and said clutch mechanism whereby said screw may be rotated in either of two ways to drive the piston in either of two directions, pressure gages with releasing means and means connecting said pressure gages with said clutch mechanism whereby said pressure gages will be released in unison with the action of said clutch mechanism.

21. A fabric testing device provided with a testing chamber and a plurality of diaphragms secured to said chamber in spaced relation to each other so that when one diaphragm bursts during a test another diaphragm will hold.

22. A fabric testing device provided with a testing chamber having a collar, a diaphragm resting on said collar, a packing ring resting on said diaphragm and a second diaphragm above the first and means for securing said second diaphragm to said chamber.

23. In a device of the class described, a bell, an annulus secured to said bell and means interposed between said annulus and said bell for preventing the squirting of fluid from the apparatus.

24. In a device of the class described, a bell, an annulus secured to the lower edge of said bell and an elastic diaphragm secured between said annulus and said bell.

25. In a testing machine, a fluid testing chamber, and a diaphragm on said chamber and a supplemental diaphragm over said first diaphragm.

26. In a testing machine, a fluid testing chamber and a diaphragm on said chamber to reinforce said first diaphragm and arranged in spaced relation to each other.

27. In a fabric testing machine, the combination of means for exerting pressure on the fabric to be tested, fabric clamping means movable perpendicularly to the plane of the fabric and co-acting with the first-named means to confine the pressure exerted thereby upon said fabric to hold the latter clamped, and means for automatically reciprocating said clamping means and for uniformly exerting an increasing pressure upon the same and upon the clamped portion of said fabric.

28. A fabric testing machine provided with a fabric clamp, and automatic means for exerting pressure on a fabric clamped thereby and independent means for increasing the pressure of the clamp upon the fabric with the increase of the pressure on the fabric.

29. A fabric testing machine comprising a fabric clamp, a testing chamber, and means for simultaneously exerting pressure upon the clamp, and in the testing chamber, including a leverage mechanism between the clamp and the pressure exerting means for increasing the pressure exerted on the clamp disproportionately to the increase of pressure exerted by said pressure means.

30. A fabric testing machine comprising a fabric clamp, a fabric disrupting means, and automatic means for operating the clamp to hold a fabric to be tested by the disrupting means and for operating the disrupting means simultaneously.

31. A fabric testing machine comprising a fabric clamp, fabric disrupting means coöperating therewith, and a pressure applying mechanism for operating the clamp and the disrupting means and for increasing the force of the clamp more rapidly than the increase of the force of the disrupting means.

32. A fabric testing machine consisting of a testing chamber, a diaphragm therefor adjacent which the fabric is placed, means for producing hydraulic pressure in the testing chamber, and a fabric clamping means controlled by said pressure means and adapted to be operated independently of the pressure means.

33. A fabric testing machine consisting of a testing chamber, a diaphragm therefor, means for producing hydraulic pressure in the testing chamber, and means for automatically reversing the pressure means when a predetermined pressure is reached.

34. A fabric testing machine consisting of a testing chamber, a diaphragm on said chamber, means for exerting pressure in the chamber to disrupt the diaphragm, and a hydraulic clamp for holding a fabric to be tested on the chamber.

35. A fabric testing machine consisting of a testing chamber, a diaphragm therefor, a hydraulic means for exerting pressure against the diaphragm, and a float valve in the chamber for controlling the outlet thereof when the diaphragm is ruptured.

36. A fabric testing machine consisting of a testing chamber, a diaphragm therefor, means for producing hydraulic pressure in the testing chamber, means coöperating with said hydraulic means for limiting the pressure exerted by the hydraulic means, and for reducing said pressure.

37. A fabric testing machine machine consisting of a testing chamber, means for clamping a fabric to be tested on said chamber, a cylinder, pistons operating in said cylinder to exert pressure on said clamping means and in said chamber, and a toggle connection between one of said pistons and the clamping means for increasing the pressure exerted on the clamping means more rapidly than the increase of pressure exerted in the testing chamber.

38. A fabric testing machine consisting of fabric disruptable means and a hydraulic clamp for holding fabric to be tested and coöperating with the fabric disruptable means.

39. A fabric testing machine consisting of a fabric testing chamber, a cylinder having communication therewith, a piston movable in the cylinder to exert pressure in the testing chamber, and a power mechanism for controlling the movement of the piston in both directions and adapted to actuate said piston in pressure reducing direction when a predetermined pressure is reached.

40. A fabric testing machine consisting of a testing chamber, a cylinder, a piston operable in the cylinder to exert pressure in the testing chamber, and controlling mechanism for the piston to return it in pressure reducing direction when a predetermined pressure has been reached.

41. An automatic fabric testing machine having means for applying hydraulic pressure on a fabric and means for reversing said pressure means when a predetermined pressure is reached.

42. A fabric testing machine having means for applying hydraulic pressure on a fabric, and means for automatically reversing said pressure means so as to reduce pressure when a predetermined pressure is reached.

43. A fabric testing machine having means for applying pressure on a fabric, means for reducing the pressure exerted on the fabric when a predetermined pressure has been reached and a fabric clamping means having means for increasing its pressure during the testing of the fabric.

44. A fabric testing machine consisting of a testing chamber in which liquid is normally disposed, means for exerting pressure on said liquid, a fabric clamping means adapted to hold fabric to be tested on said chamber and adapted to receive liquid from said chamber when said fabric is disrupted thereby, and means actuated by said pressure liquid for holding said fabric clamping means in clamping position.

45. A fabric testing machine provided with pressure exerting means, means for limiting the pressure exerted by said means and pressure indicating means coöperating therewith to return to zero when the limit of pressure is reached.

46. A fabric testing machine provided with pressure exerting means, means for limiting the pressure exerted thereby, a pressure indicator means for automatically resetting said indicator movably by said limiting means.

47. A fabric testing machine provided with fabric holding means, a pressure means for disrupting a fabric held thereby, means for limiting the pressure exerted by the means, and means for automatically returning the system to normal.

48. A fabric testing machine consisting of a fabric holding means, a piston adapted to exert pressure on a fabric held by said holding means, and automatic means for limiting the pressure exerted by the piston and for returning the same to normal position.

49. A fabric testing machine consisting of a fabric holding means, a reciprocating pressure means for exerting pressure on a fabric held by said holding means, a pressure indicator, and means controlled by said means for resetting the indicator.

50. A testing machine provided with a fluid testing chamber, means for applying fluid under pressure to said chamber, means for indicating the pressure of said fluid, and means controlled by said applying means for resetting the indicating means to zero.

51. In a testing machine, a fluid testing chamber having pressure exerting means, a clamp for holding a fabric thereon, a plunger for exerting pressure on a fluid in said chamber, means for exerting pressure on said clamp controlled by said plunger and adapted to be disconnected from the clamp when the plunger is reversed.

Signed in the city, county and State of New York, this 6th day of January, 1912.

WILLIAM H. PUTNAM.
CLESSON W. PUTNAM.

Witnesses:
O. E. EDWARDS, Jr.,
GUSTAVE I. ARONOW.